(12) United States Patent
Yamamoto et al.

(10) Patent No.: US 12,099,143 B2
(45) Date of Patent: Sep. 24, 2024

(54) MEASURING DEVICE, CONTROL METHOD, PROGRAM, AND STORAGE MEDIUM

(71) Applicant: PIONEER CORPORATION, Tokyo (JP)

(72) Inventors: Koji Yamamoto, Tokyo (JP); Shogo Miyanabe, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 1070 days.

(21) Appl. No.: 16/975,089

(22) PCT Filed: Feb. 7, 2019

(86) PCT No.: PCT/JP2019/004375
§ 371 (c)(1),
(2) Date: Aug. 21, 2020

(87) PCT Pub. No.: WO2019/163526
PCT Pub. Date: Aug. 29, 2019

(65) Prior Publication Data
US 2020/0393546 A1 Dec. 17, 2020

(30) Foreign Application Priority Data
Feb. 22, 2018 (JP) .................... 2018-029827

(51) Int. Cl.
*G01C 3/08* (2006.01)
*G01S 7/481* (2006.01)
(Continued)

(52) U.S. Cl.
CPC .......... *G01S 7/4817* (2013.01); *G01S 17/931* (2020.01); *G02B 26/0816* (2013.01); *G02B 26/101* (2013.01)

(58) Field of Classification Search
CPC .... G01S 7/4817; G01S 7/497; G02B 26/0816
(Continued)

(56) References Cited

U.S. PATENT DOCUMENTS 5,936,767 A 8/1999 Favalora
7,079,298 B2 7/2006 Kandori et al.
(Continued)

FOREIGN PATENT DOCUMENTS

CN 107402061 A * 11/2017 ............ G01H 9/00
JP 2004264670 A 9/2004
(Continued)

OTHER PUBLICATIONS

Machine Translation of JP 5335982 B2 (Year: 2013).*
(Continued)

*Primary Examiner* — Mark Hellner
(74) *Attorney, Agent, or Firm* — Procopio, Cory, Hargreaves & Savitch LLP

(57) ABSTRACT

An electromagnetic wave irradiated by an irradiator (10) is incident on and reflected by a movable reflection unit (20). The control unit (30) controls the irradiator (10) and the movable reflection unit (20). A sensor (40) is disposed at a position through which the electromagnetic wave when an irradiation direction of the electromagnetic wave is moved in a first direction. Then, the control unit (30) executes the following processing in setting a movement range of the movable reflection unit (20). First, a detection value (first detection value) of the sensor (40) when light is irradiated at a first position Sa positioned ahead of the sensor (40) in the first direction is recognized. Next, a detection value (second detection value) of the sensor (40) when light is irradiated at a second position Sb positioned behind the sensor (40) in the first direction is recognized. Then, the movement range of
(Continued)

the movable reflection unit (20) is set using the first detection value and the second detection value.

11 Claims, 11 Drawing Sheets

(51) Int. Cl.
*G01S 17/931* (2020.01)
*G02B 26/08* (2006.01)
*G02B 26/10* (2006.01)

(58) Field of Classification Search
USPC .......................................................... 356/4.01
See application file for complete search history.

(56) References Cited

U.S. PATENT DOCUMENTS

| | | | |
|---|---|---|---|
| 7,126,733 | B2 | 10/2006 | Kandori et al. |
| 7,576,315 | B2 | 8/2009 | Taniguchi et al. |
| 8,085,262 | B2 | 12/2011 | Kobayashi et al. |
| 8,519,324 | B2 | 8/2013 | Tsuida |
| 10,546,561 | B2 * | 1/2020 | Kusanagi ............... G02B 27/01 |
| 2004/0240017 | A1 | 12/2004 | Kandori et al. |
| 2005/0057557 | A1 | 3/2005 | Kobayashi et al. |
| 2006/0176535 | A1 | 8/2006 | Kandori et al. |
| 2006/0192094 | A1 | 8/2006 | Taniguchi et al. |
| 2006/0291027 | A1 | 12/2006 | Taniguchi |
| 2009/0316243 | A1 | 12/2009 | Tsuida |
| 2016/0018256 | A1 * | 1/2016 | Mushimoto ........... G01J 1/4257 356/5.01 |
| 2018/0284224 | A1 * | 10/2018 | Weed ...................... G01S 17/42 |

FOREIGN PATENT DOCUMENTS

| | | | |
|---|---|---|---|
| JP | 2007003687 A | 1/2007 | |
| JP | 5335982 B2 * | 11/2013 | ............. G03B 21/00 |
| JP | 2017167254 A | 9/2017 | |
| WO | 2008032485 A1 | 3/2008 | |
| WO | 2011125495 A1 | 10/2011 | |

OTHER PUBLICATIONS

Extended European Search Report dated Oct. 18, 2021 from counterpart EP Patent Application No. 19757948.5, 9 pages.
International Search Report for related Int. App. No. PCT/JP2019/004375 dated May 7, 2019; 2 Pages.

* cited by examiner

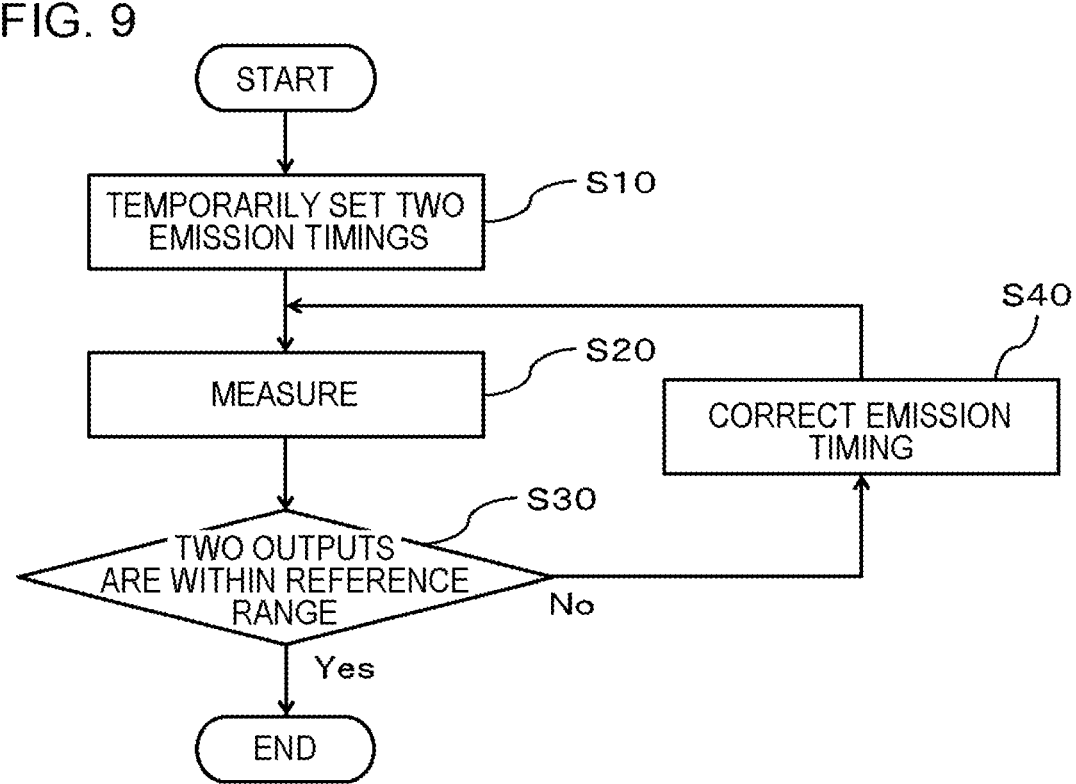

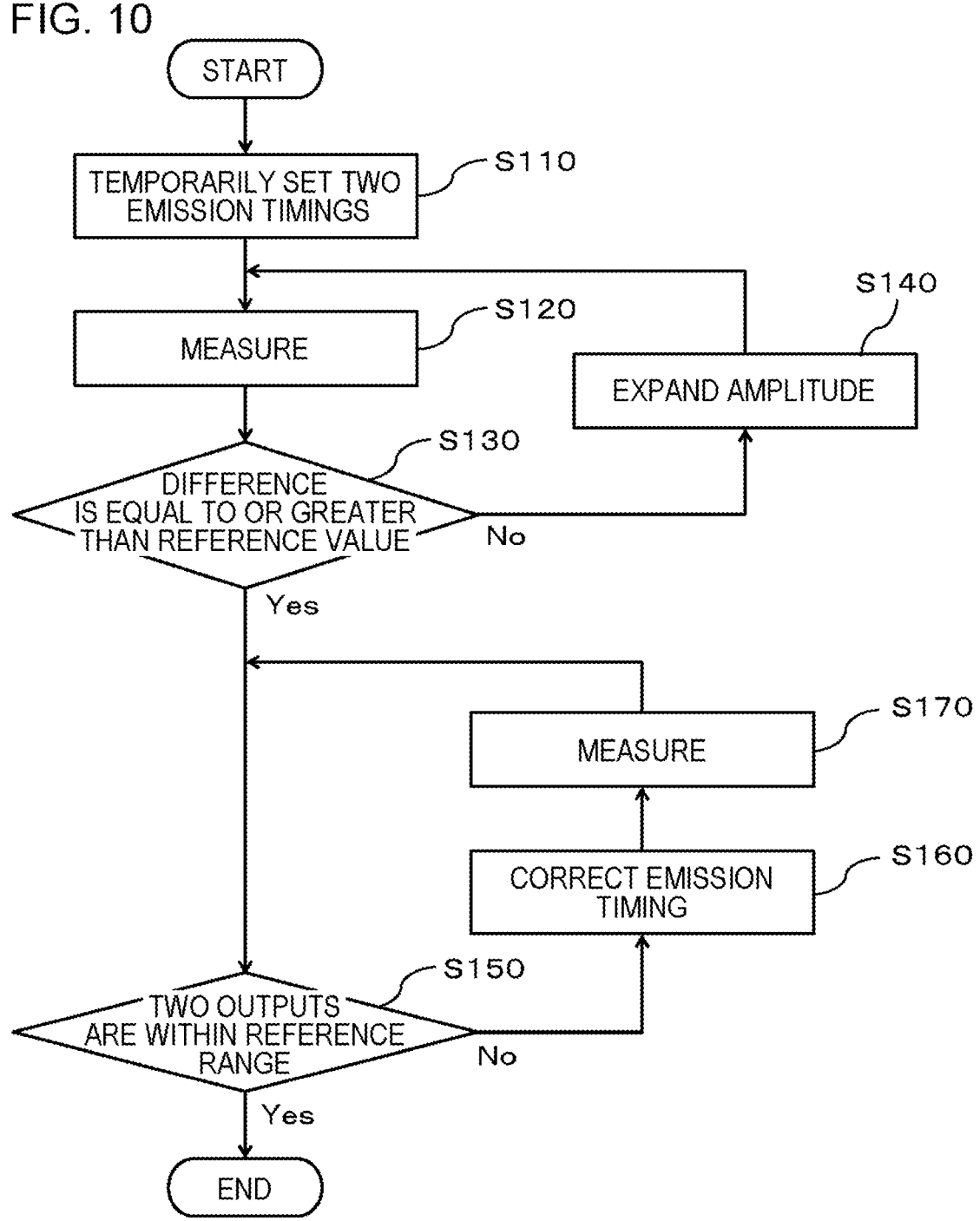

MEASURING DEVICE, CONTROL METHOD, PROGRAM, AND STORAGE MEDIUM

CROSS-REFERENCE TO RELATED APPLICATIONS

This application is a U.S. National Stage entry of PCT Application No. PCT/JP2019/004375 filed Feb. 07, 2019, which claims priority to Japanese Patent Application No. 2018-029827, filed Feb. 22, 2018, the contents of which are incorporated herein by reference.

TECHNICAL FIELD

The present invention relates to a measuring device, a control method, a program, and a storage medium.

BACKGROUND ART

In recent years, an electromagnetic wave type sensor is provided in a mobile object, such as a vehicle, and control of the mobile object is performed using a detection result of the sensor. In the sensor for such an application, the electromagnetic wave to be emitted is moved using a device, such as Micro Electro Mechanical Systems (MEMS).

An example of a device for moving the electromagnetic wave is described in Patent Document 1. The device described in Patent Document 1 has a movable reflection mirror. The reflection mirror is vibrated by electrostatic force generated on an electrode. The electrostatic force is controlled by a voltage applied to the electrode.

RELATED DOCUMENT

Patent Document

[Patent Document 1] Japanese Unexamined Patent Publication No. 2017-167254

SUMMARY OF THE INVENTION

Technical Problem

There is a possibility that a movement range of the electromagnetic wave of the sensor is shifted due to various factors even after the sensor is mounted in the mobile object. For this reason, even after a measuring device having the sensor is mounted in the mobile object, it is necessary to enable correction of the movement range of the electromagnetic wave.

An example of a problem to be solved by the invention is to enable correction of a movement range of an electromagnetic wave after a measuring device that emits the electromagnetic wave is mounted in a mobile object.

Solution to Problem

According to the invention of claim 1, there is provided a measuring device including
an irradiator that irradiates an electromagnetic wave;
a movable reflection unit that reflects the electromagnetic wave;
a control unit that moves the electromagnetic waves along the first direction by controlling the irradiator and the operating reflector; and
a sensor that is able to receive the electromagnetic wave,
wherein the sensor is disposed at a position through which the electromagnetic wave passes when the electromagnetic wave is moved in the first direction, and
wherein the control unit sets a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction.

According to the invention of claim 8, a control method for use in a measuring device including an irradiator that irradiates an electromagnetic wave, a movable reflection unit that reflects the electromagnetic wave, a control unit that moves the electromagnetic waves along the first direction by controlling the irradiator and the operating reflector, and a sensor that is able to receive the electromagnetic wave,
the sensor being disposed at a position through which the electromagnetic wave passes when the electromagnetic wave moves in the first direction,
the control method including a setting step of setting a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction.

According to the invention of claim 9, there is provided a program that causes a computer to function as a control unit controlling a measuring device,
the measuring device including
an irradiator that irradiates an electromagnetic wave,
a movable reflection unit that reflects the electromagnetic wave, and
a sensor that is able to receive the electromagnetic wave, and
the sensor being disposed at a position through which the electromagnetic wave passes when the electromagnetic wave moves in a first direction,
the program providing the computer with
a function of moving the electromagnetic waves along the first direction by controlling the irradiator and the operating reflector; and
a function of setting a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction.

According to the invention of claim 10, there is provided a storage medium storing the program according to claim 9.

BRIEF DESCRIPTION OF THE DRAWINGS

The above and other objectives, features, and advantages will become apparent from preferred embodiments described below and the accompanying drawings.

FIG. 9 is a flowchart showing a first example of a method of resetting the first position Sa and the second position Sb.

FIG. 10 is a flowchart showing a second example of a method of resetting the first position Sa and the second position Sb.

DESCRIPTION OF EMBODIMENTS

Figure 1:
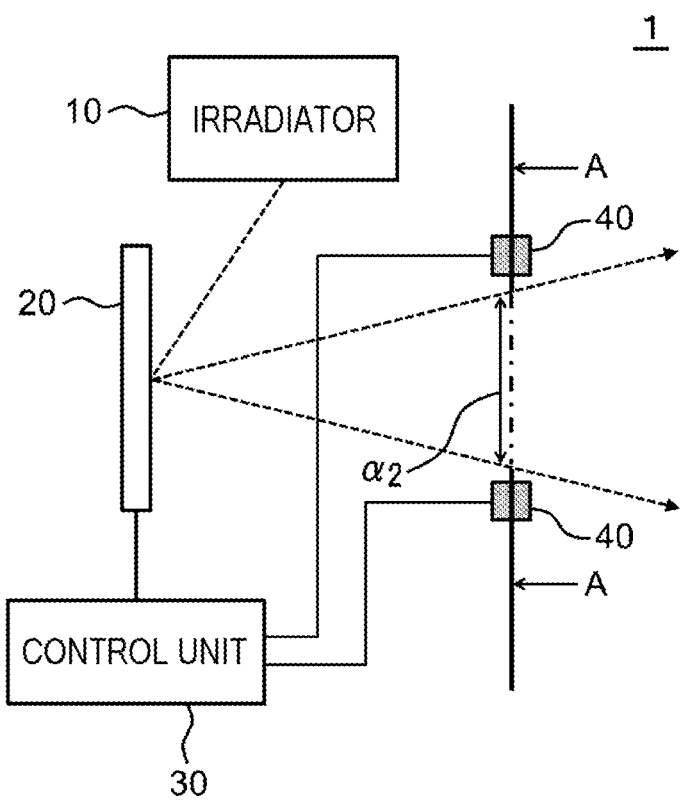
FIG. 1 is a diagram showing the configuration of a measuring device I according to an embodiment.

Hereinafter, an embodiment of the invention will be described referring to the drawings. In all drawings, like components are represented by like reference numerals, and description thereof will not be repeated.

Embodiment

FIG. 1 is a diagram showing the configuration of a measuring device 1 according to the embodiment. The measuring device 1 includes an irradiator 10, a movable reflection unit 20, a control unit 30, and a sensor 40. The irradiator 10 irradiates an electromagnetic wave, for example, light. The electromagnetic wave irradiated by the irradiator 10 is incident on and reflected by the movable reflection unit 20. The movable reflection unit 20 changes a traveling direction of the electromagnetic wave irradiated by the irradiator 10, for example, by oscillating. The control unit 30 controls the irradiator 10 and the movable reflection unit 20. The sensor 40 can receive the electromagnetic wave. The sensor 40 is disposed behind the movable reflection unit 20 in the traveling direction of the electromagnetic wave. The sensor 40 is disposed at a position through which the electromagnetic wave passes when an irradiation direction of the electromagnetic wave is moved in a first direction. Then, the control unit 30 executes the following processing in setting a movement range of the movable reflection unit 20 (setting step). First, a detection value (hereinafter, referred to as a first detection value) of the sensor 40 when light is irradiated at a first position Sa positioned ahead of the sensor 40 in the first direction is recognized. Next, a detection value (hereinafter, referred to as a second detection value) of the sensor 40 when light is irradiated at a second position Sb positioned behind the sensor 40 in the first direction is recognized. Then, the movement range of the movable reflection unit 20 is set using the first detection value and the second detection value. Hereinafter, the measuring device 1 will be described in detail. In the following description, it is assumed that the electromagnetic wave is light.

The measuring device 1 is mounted, for example, in a mobile object, such as a vehicle. In this case, the measuring device 1 is, for example, Light Detection And Ranging (LIDAR) and detects a relative position of an object positioned around the mobile object when the mobile object is set as a reference. In this case, the measuring device 1 also includes a light receiver.

The irradiator 10 is, for example, a semiconductor laser, such as a laser diode, and emits laser with an input of electric energy. The control unit 30 controls an emission timing and emission intensity of the irradiator 10 by controlling power input to the irradiator 10.

The movable reflection unit 20 includes at least one movable mirror and can vary an irradiation direction of light emitted from the irradiator 10 in a two-dimensional manner. For example, the movable reflection unit 20 moves an irradiation direction of light in the above-described first direction cyclically and simultaneously moves the irradiation direction of light in a second direction different from the first direction cyclically. In a case where the movable reflection unit 20 has one movable mirror, an inclination of the movable mirror can be varied around each of two axes perpendicular to each other. In a case where the movable reflection unit 20 has two movable mirrors, the axes of the two movable mirrors are perpendicular to each other.

The inclination of the movable mirror provided in the movable reflection unit 20 can be controlled, for example, by a voltage input to the movable reflection unit 20. The voltage is controlled by the control unit 30. Specifically, the voltage input, to the movable reflection unit 20 changes cyclically. The voltage is, for example, a sinusoidal wave. In this case, a reflection direction of light of the movable reflection unit 20 is changed cyclically, for example, in a sinusoidal manner.

The control unit 30 is realized using, for example, an integrated circuit. The integrated circuit has, for example, a bus, a processor, a memory, a storage device, an input-output interface, and a network interface. The bus is a data transmission path through which the processor, the memory, the storage device, the input-output interface, and the network interface transmit and receive data to and from one another. Note that a method for connecting the processor and the like to one another is not limited to bus connection. The processor is an arithmetic processing device that is realized using a microprocessor or the like. The memory is a memory that is realized using a random Access Memory (RAM) or the like. The storage device is a storage device that is realized using a Read Only Memory (ROM), a flash memory, or the like.

The input-output interface is an interface that connects the integrated circuit to peripheral devices. The peripheral devices are, for example, the irradiator 10 and the movable reflection unit 20.

The network interface is an interface that connects the integrated circuit to a communication network. The communication network is, for example, a Controller Area Network (CAN) communication network. A connection method of the network interface to the communication network may be wireless connection or may be wired connection.

The storage device stores a program module that realizes the function of the control unit 30. The processor realizes the function of the control unit 30 by reading the program module into the memory and executing the program module. The program module may be stored in the memory. In this case, the integrated circuit may net include the storage device.

The sensor 40 has a photoelectric conversion element and detects the intensity of light incident on the sensor 40. A signal from the sensor 40 is input to the control unit 30. The control unit 30 sets a movement range of the movable mirror of the movable reflection unit 20 using the detection value of the sensor 40. Specifically, the control unit 30 sets a signal input to the movable reflection unit 20 using the detection value of the sensor 40. In a case where the irradiator 10 emits an electromagnetic wave other than light, the sensor 40 has an element that detects an electromagnetic wave corresponding to the wavelength of the electromagnetic wave.

Figure 2:
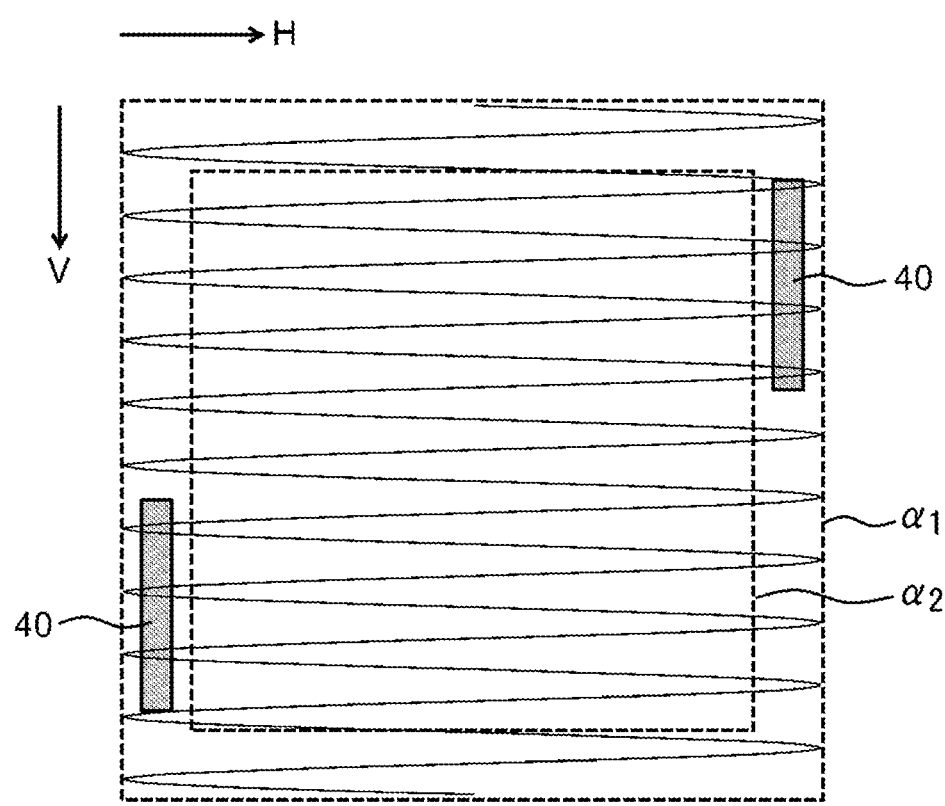
FIG. 2 is a diagram illustrating an irradiatable range of light of a movable reflection unit and a position of a sensor.

FIG. 2 is a diagram illustrating an irradiatable range of light of the movable reflection unit 20 and a position of the sensor 40, and corresponds to an A-A cross-section of FIG. 1. As described above, the movable reflection unit 20 moves light from the irradiator 10. When a range in which light can be irradiated by the movable reflection unit 20 is a movable range α1, a range for use in the measurement of the measuring device 1 is a part (hereinafter, referred to as a measurement range α2) of the movable range α1. Specifically, the control unit 30 makes the irradiator 10 emit light at a timing at which the movable reflection unit 20 reflects light toward the measurement range α2, and makes the irradiator 10 not emit light at a timing at which the movable reflection unit 20 reflects light toward the outside of the measurement range α2. For this reason, even though the sensor 40 is provided, the measurement of the measuring device 1 is not affected.

In an example shewn in FIG. 2, the control unit 30 moves light in the first direction (H direction) cyclically and simultaneously moves light in the second direction (V direction) perpendicular to the first direction cyclically. The first direction corresponds to a first rotation axis of the movable reflection unit 20, and the second direction corresponds to a second rotation axis of the movable reflection unit 20. Then, a movement cycle in the first direction is shorter than a movement cycle in the second direction. For example, the control unit 30 uses a sinusoidal wave for a control signal for controlling the movement in the first direction (H direction) among signals input to the movable reflection unit 20 and uses a signal (for example, a sawtooth wave) having a cycle longer than the sinusoidal wave for a control signal for controlling the movement in the second direction (V direction) among the signals input to the movable reflection unit 20. For this reason, as shown in FIG. 2, light gradually moves in the V direction (horizontal direction) while moving in the H direction (horizontal direction) cyclically in FIG. 2. As a result, the movable range α1 has a substantially rectangular shape.

In the example shown in FIG. 2, the sensor 40 is a line sensor. Then, a direction in which the sensor 40 extends, that is, a longitudinal direction of the sensor 40 is the second direction. A length of the sensor 40 is shorter than a side in the second direction of the measurement range α2 in a plane including the sensor 40. Note that the length of the sensor 40 is not limited thereto.

A plurality of sensors 40 may be provided. In the example shown in the drawing, the sensors 40 are provided along two sides extending in the second direction of the measurement range α2 shown in FIG. 2, respectively. In a case where the sensors 40 are shorter than the sides of the measurement range α2, it is preferable that the two sensors 40 are provided at diagonal positions.

Figure 3A:
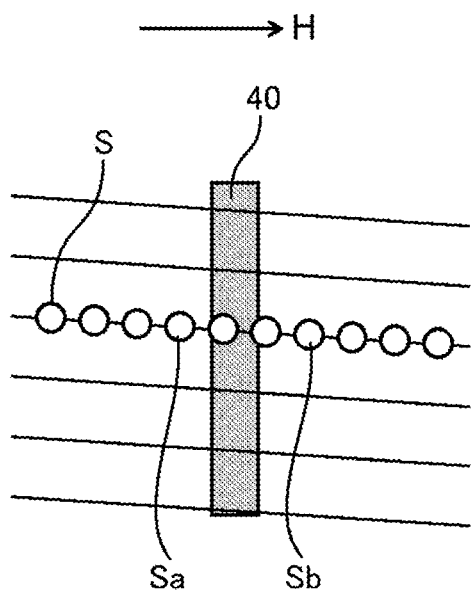
FIG. 3(A) is a diagram showing relative positions of light from an irradiator and the sensor in a plane including the sensor.
Figure 3B:
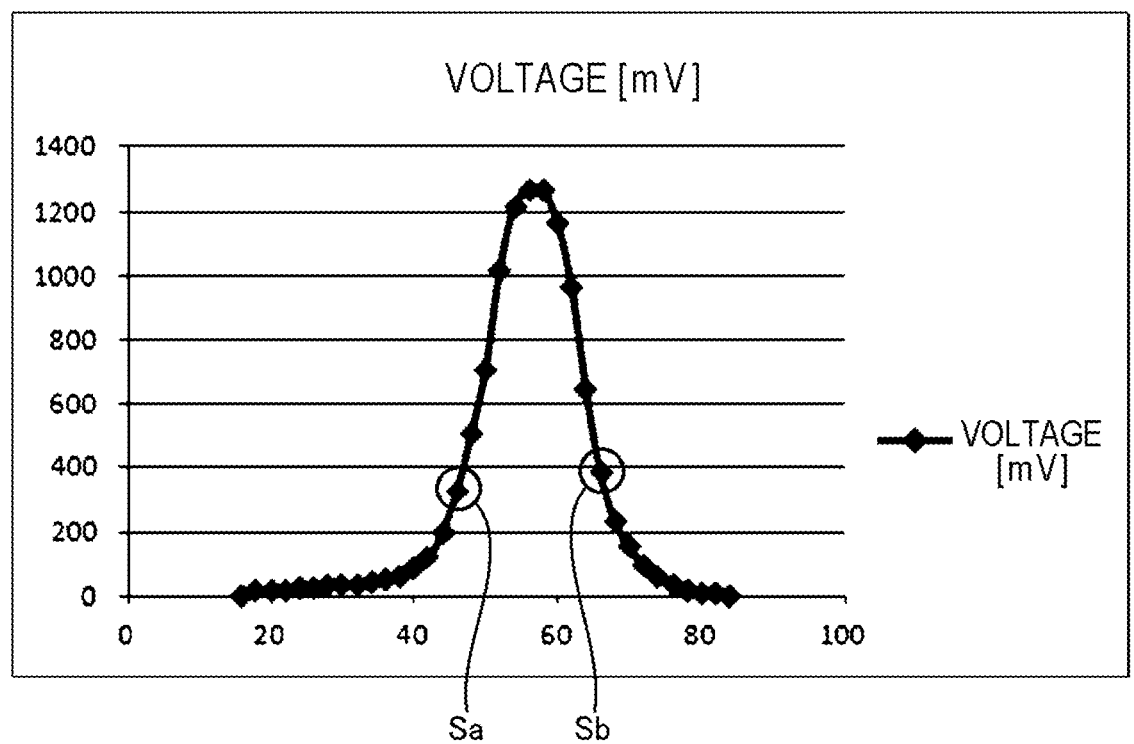
FIG. 3(B) is a diagram showing an example of an output from the sensor.

FIG. 3 is a diagram illustrating a method of setting the movement range of the movable reflection unit 20 in the control unit 30. In detail, FIG. 3(A) is a diagram showing relative positions of light from the irradiator 10 and the sensor 40 in the plane including the sensor 40, and FIG. 3(B) is a diagram showing an example of an output from the sensor 40. In FIG. 3(B), the horizontal axis indicates an inclination of the movable mirror of the movable reflection unit 20.

The control unit 30 makes the irradiator 10 emit light intermittently at given intervals. For this reason, as shown in FIG. 3(A), a position S of the center of light irradiated from the irradiator 10 gradually moves in the first direction (H direction). The given interval may be an interval on time or an interval (distance) on a space.

Light from the irradiator 10 has a spread to a certain level in passing through the plane including the sensor 40. For this reason, the output of the sensor 40 has a certain size even though the position S does not overlap the sensor 40. In detail, as shown in FIG. 3(B), in a case where the position S overlaps the sensor 40, the output of the sensor 40 becomes a maximum, and as the position S is separated from the sensor 40, the output of the sensor 40 is rapidly lowered.

Here, there is a concern that the amplitude of the movable reflection unit 20 changes due to various factors even though a drive signal is not changed. For this reason, even after the measuring device 1 is mounted in the mobile object, it is necessary to enable the correction of the amplitude of the movable reflection unit 20.

In the embodiment, the amplitude of the movable reflection unit 20 is corrected using the detection value of the sensor 40 when light is irradiated at the first position Sa positioned ahead of the sensor 40 in the first direction, that is, the first detection value, and the detection value of the sensor 40 when light is irradiated at the second position Sb positioned behind the sensor 40 in the first direction, that is, the second detection value. For example, an emission timing of the irradiator 10 is determined in advance baaed on when the movable reflection unit 20 is at a reference position, for example, an inclination angle is 0°. Specifically, the emission timing of the irradiator 10 is determined to each of a timing at which the movable reflection unit 20 is at the first position Sa and a timing at which the movable reflection unit 20 is at the position of the second position Sb. The timing is determined in advance, for example, before the measuring device 1 is mounted in the mobile object and is stored in advance in a storage medium of the control unit 30. Then, the amplitude of the movable reflection unit 20 is corrected such that the detection value (first detection value or the second detection value) of the sensor 40 at each timing sat is flea a reference.

The reference in this case may be, for example, the magnitude of the first detection value is within a reference range and the magnitude of the second detection value is within a reference range or may be that a difference between the first detection value and the second detection value is within a reference range (for example, equal to or less than a reference value). In the former case, the reference range of the first detection value may be the same as or different from the reference range of the second detection value.

Figure 4:
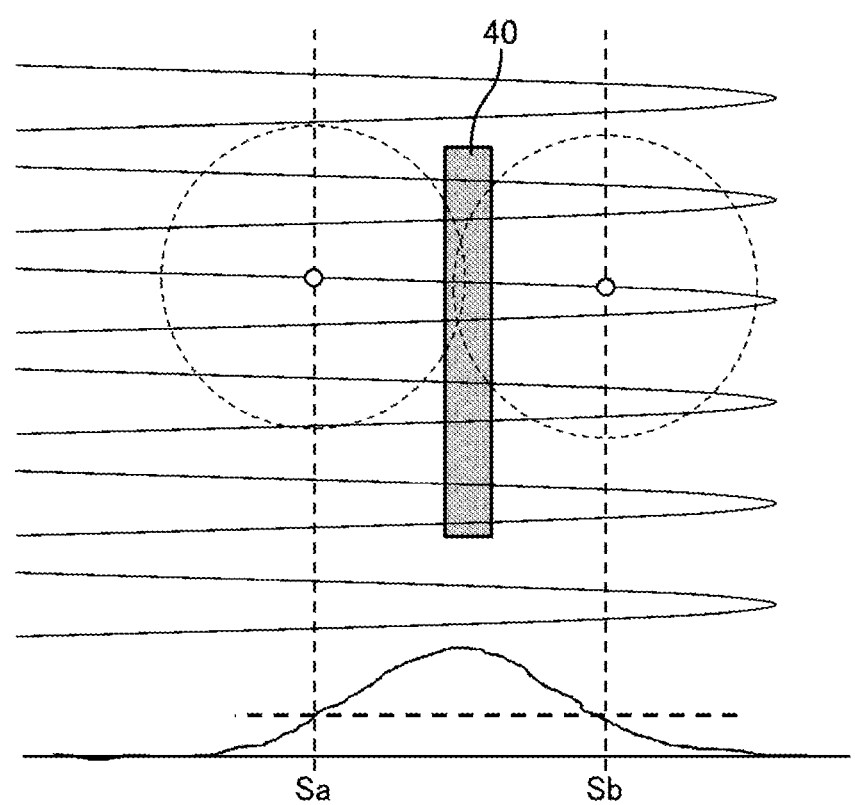
FIG. 4 is a diagram illustrating a specific example of correction of amplitude.

A specific example of the correction of the amplitude will be specifically described referring to FIGS. 4 and 5. In the drawings, a left side is a center side of the moveable range α1, and a right side is an edge side of the movable range α1. As shown in FIG. 4, the positions of the first position Sa and the second position Sb are determined to be symmetrical to each other based on the sensor 40 in a state in which the amplitude of the movable reflection unit 20 is normal. Then, in a state in which the amplitude of the movable reflection unit 20 is normal, the first detection value and the second detection value become the same.

Figure 5A:
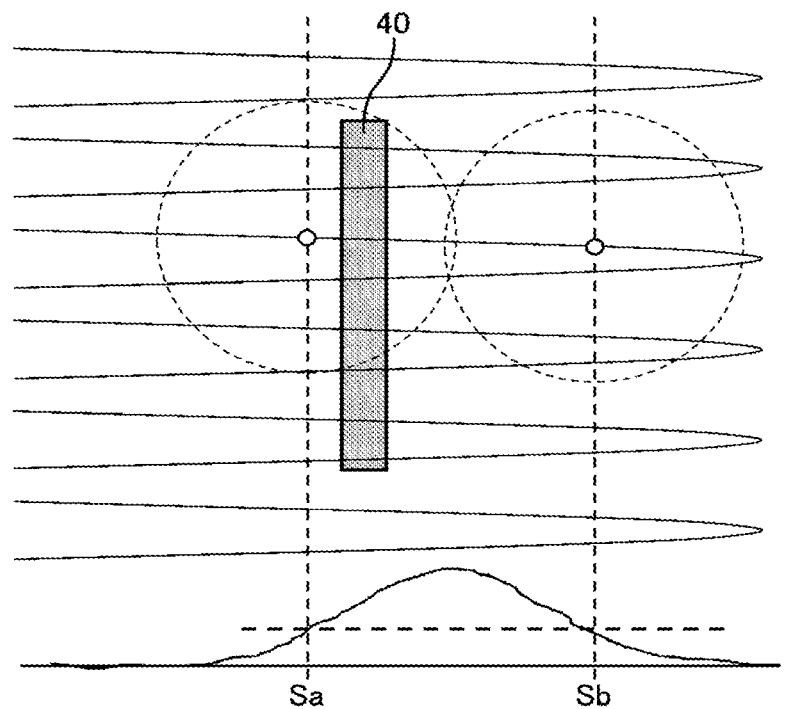
FIGS. 5(A) and 5(B) are diagrams illustrating a specific example of correction of amplitude.

Here, as shown in FIG. 5(A), a case where the amplitude of the movable reflection unit 20 becomes greater than the setting is considered. In general, even though the amplitude of the movable reflection unit 20 is changed, a time necessary for one cycle of the movable reflection unit 20 is constant. Because of this, when the amplitude of the movable reflection unit 20 becomes large, the first position Sa and the second position Sb are moved to the outside (the right side in FIG. 5) together. For this reason, the first detection value becomes greater than the reference, and the second detection value becomes smaller than the reference. A value obtained by subtracting the second detection value from the first detection value becomes a positive value and becomes greater than the reference. In a case where the first detection value and the second detection value become as described above, the control unit 30 makes the movement range of the movable reflection unit 20, fox example, the amplitude small.

Figure 5B:
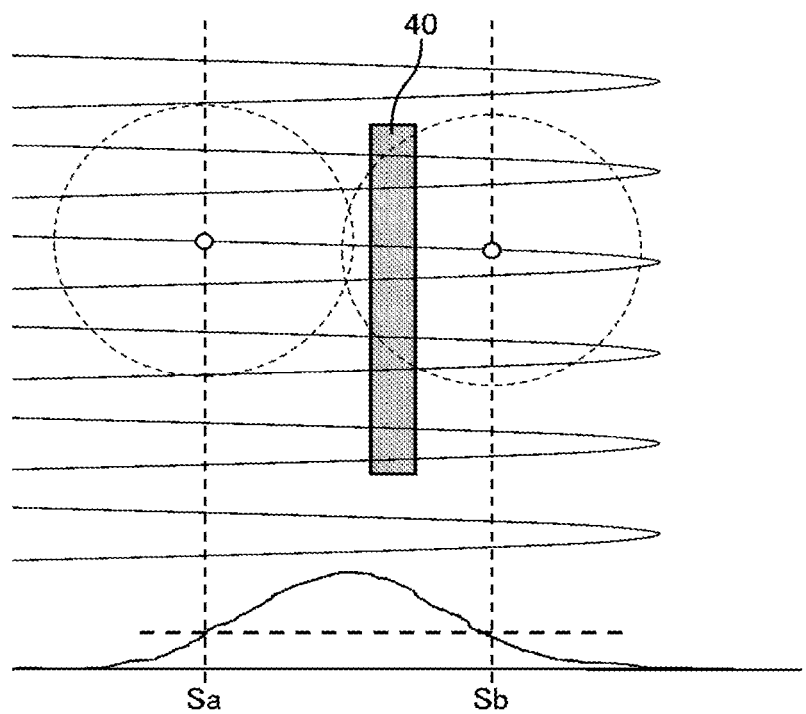

Next, as shown in FIG. 5(B), a case where the amplitude of the movable reflection unit 20 becomes less than the setting is considered. In this case, the first position Sa and the second position Sb are moved to the inside (the left side in FIG. 6) together. For this reason, the first detection value becomes smaller than the reference, and the second detection value becomes greater than the reference. A value obtained by subtracting the second detection value from the first detection value becomes negative and becomes greater than the reference. In a case where the first detection value and the second detection value become as described above, the control unit 30 makes the movement range of the movable reflection unit 20, for example, the amplitude large.

Figure 6:
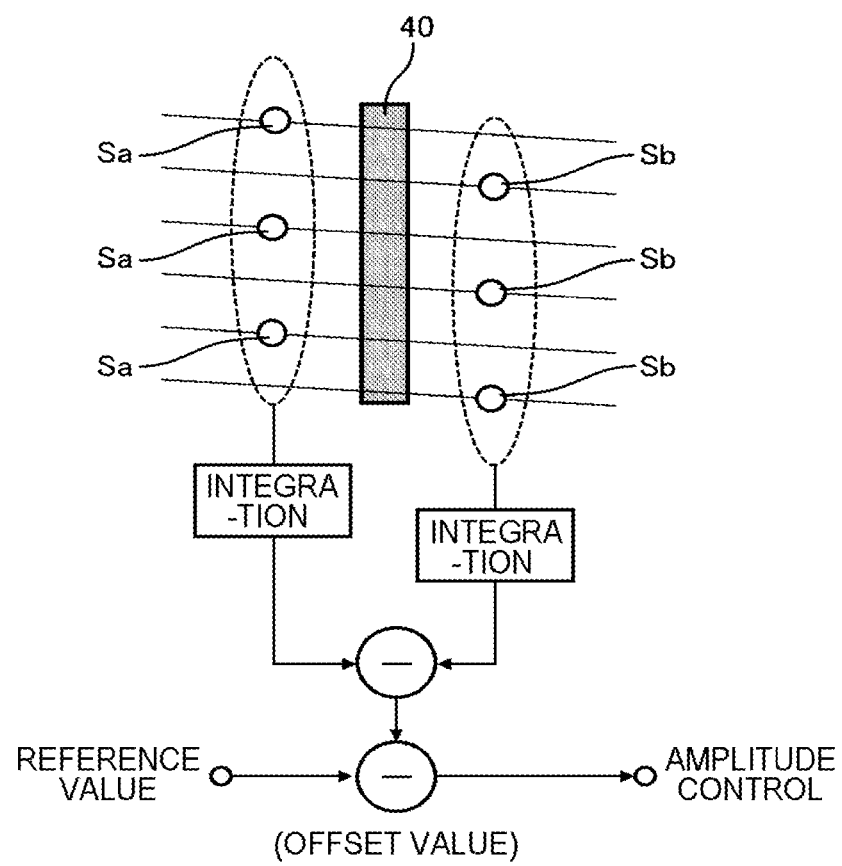
FIG. 6 is a diagram showing a modification example of processing of the output of the sensor in the control unit 30.

FIG. 6 is a diagram showing a modification example of processing of the output of the sensor 40 in the control unit 30. In an example shown in the drawing, measurement is performed at the first position Sa and the second position Sb in each of a plurality of cycles. In this way, a plurality of first measurement values are obtained, and a plurality of second measurement values are obtained. The control unit 30 integrates a plurality of first measurement values and integrates a plurality of second measurement values. Then, the movement range of the movable reflection unit 20, for example, the amplitude is controlled such that a difference between the integrated values satisfies the above-described reference. Then, since a measurement error of the sensor 40 is reduced by integration, it is possible to correct the amplitude of the movable reflection unit 20 with high accuracy. The integration of the first measurement values and the integration of the second measurement values may be performed by a circuit different from the control unit 30.

Figure 7:
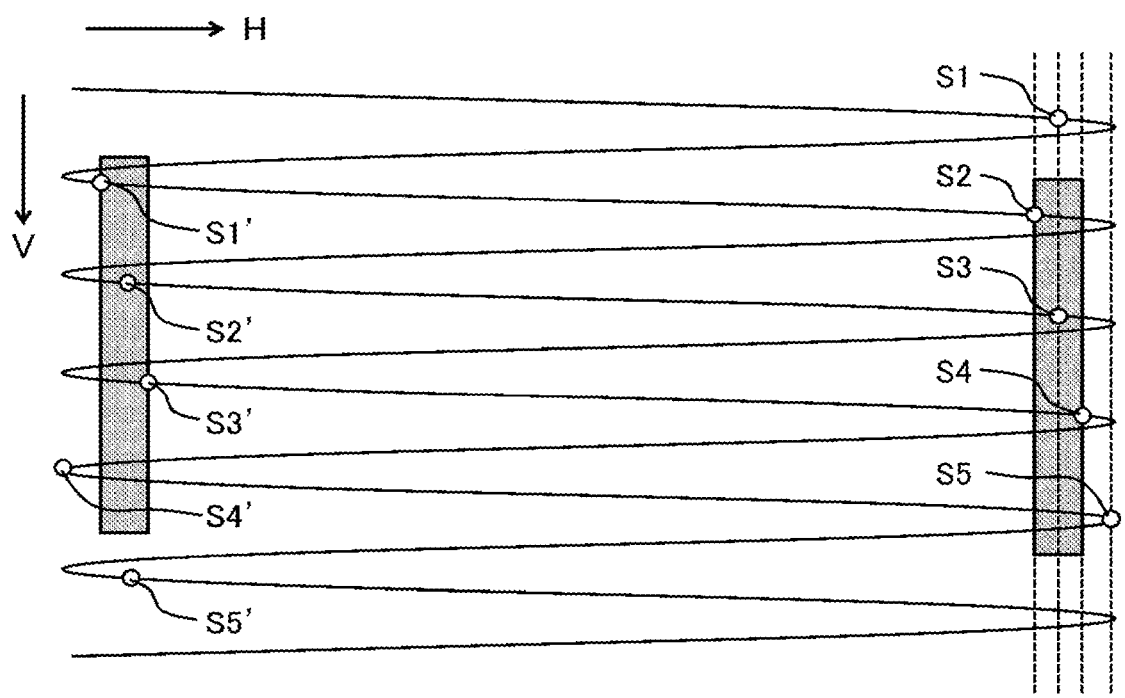
FIG. 7 is a diagram showing a modification example of a first position Sa and a second position Sb.

FIG. 7 is a diagram showing a modification example of the first position Sa and the second position Sb. As described above, the control unit 30 moves light in the first direction (H direction) cyclically and simultaneously moves light in the second direction (V direction) perpendicular to the first direction cyclically. For this reason, it is preferable that the correction of the amplitude of the movable reflection unit 20 is performed in each of the first direction and the second direction.

In a first example, in correcting the amplitude of the first direction (H direction) in FIG. 7, S2 is used as the first position Sa, and S4 is used as the second position Sb. In this case, the first position Sa, the center of the sensor 40, and the second position Sb are arranged in this order in a width direction of the sensor 40, that is, in the first direction. In this case, the control unit 30 corrects the amplitude of the movable reflection unit 20 in the H direction such that the difference between the first detection value and the second detection value becomes equal to or less than the reference value.

In a case of correcting the amplitude in second direction (V direction) in FIG. 7, S1 is used as the first position Sa, and S3 is used as the second position Sb. In other words, the first position Sa is outside the sensor 40 in the direction (V direction) in which the sensor 40 extends and overlaps the sensor 40 in the width direction (H direction) of the sensor 40. The second position Sb overlaps the sensor 40 in each of the V direction and the H direction. In this case, the control unit 30 corrects the amplitude of the control unit 30 in the V direction such that the second detection value becomes greater than the first detection value by the reference value or more (the second detection value » the first detection value).

The sensors 40 are provided along two sides of the measurement range α2 facing each other. Then, the above-described correction is performed for each of the two sensors 40.

In a second example, S1 provided above one sensor 40 in the V direction is referred to as the first position Sa, and S5' provided below the ether sensor 40 in the V direction is the second position Sb. In other words, the first position Sa and the second position Sb are provided on a diagonal of the measurement range α2. In this case, the control unit 30 corrects the amplitude of the movable reflection unit 20 in the H direction and corrects the amplitude of the movable reflection unit 20 in the V direction such that the difference between the first detection value and the second detection value becomes equal to or less than the reference value.

As described above, according to the embodiment, the measuring device 1 has the sensor 40. The control unit 30 sets the oscillation range of the movable reflection unit 20 using the detection value (first detection value) of the sensor 40 when light is irradiated at the first position Sa positioned ahead of the sensor 40 in the first direction and the detection value (second detection value) of the sensor 40 when light is irradiated at the second position Sb positioned behind the sensor 40 in the first direction. With this, even after the measuring device 1 is mounted in the mobile object, the control unit 30 can correct the amplitude of the movable reflection unit 20.

MODIFICATION EXAMPLE 1

In the above-described embodiment, the timing at which the irradiator 10 should emit light, that is, the timing at which the irradiation direction of the movable reflection unit 20 becomes the first position Sa and the timing at which the irradiation direction of the movable reflection unit 20 becomes the second position Sb are stored in advance in the control unit 30. In the modification example, a method of determining the timings will be described referring to FIGS. 8(A) and 8(B).

Figure 8A:
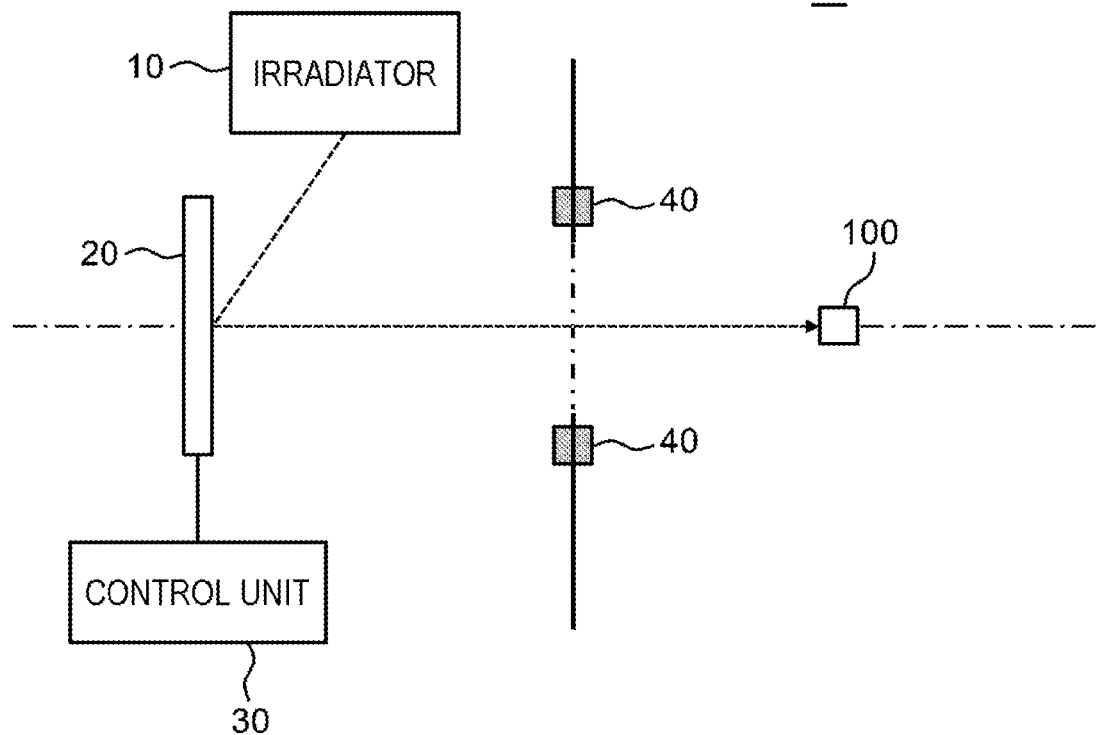
FIGS. 8(A) and 8(B) are diagrams illustrating a method of determining a timing at which an irradiation direction of the movable reflection unit becomes the first position Sa and a timing at which the irradiation direction of the movable reflection unit becomes second position Sb.
Figure 8B:
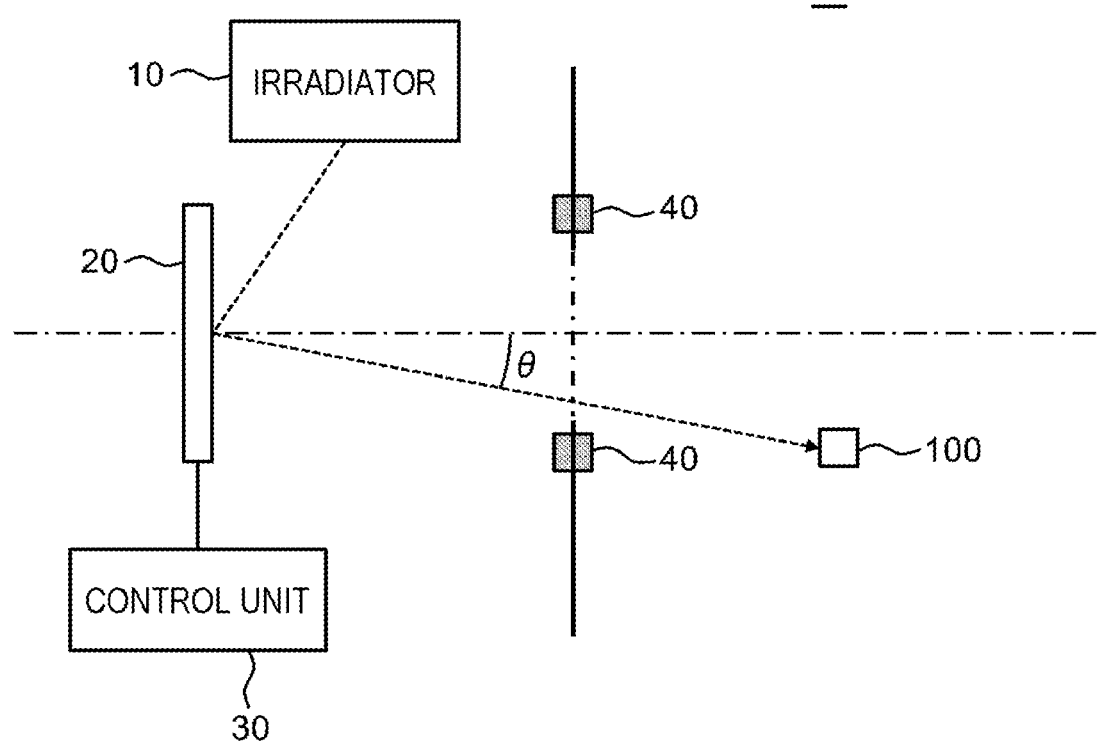

The timing at which the irradiation direction of the movable reflection unit 20 becomes the first position Sa and the timing at which the irradiation direction of the movable reflection unit 20 becomes the second position Sb are determined using an external sensor 100 different from the measuring device 1. Specifically, first, as shown in FIG. 8(A), the measuring device 1 is made to emit light in a state in which the movable reflection unit 20 is at the reference position, for example, the inclination angle is 0°. In this state, light from the measuring device 1 is made to be incident on the external sensor 100.

Next, the external sensor 100 is moved from the above-described position at a predetermined angle (for example, 10°) around the measuring device 1. Then, a signal input to the movable reflection unit 20 is gradually varied. With this, the angle of the movable reflection unit 20 is gradually charged, and as a result, the orientation of light emitted from the measuring device 1 is changed. Then, an input signal to the movable reflection unit 20 when light is incident on the external sensor 100 is handled as a signal when light is directed at the above-described predetermined angle θ. An external writing device calculates, using the signal, the input signal to the movable reflection unit 20 when an emission direction of light of the measuring device 1 is set at each angle and writes information indicating the calculated signal to the storage medium of one control unit 30.

The above-described processing is executed for each of the first direction (H direction) and the second direction (V direction).

Then, the control unit 30 changes an inclination direction of the movable reflection unit 20 using information written to the storage medium of the control unit 30 and detects the orientation of the movable reflection unit 20 when light is incident on the sensor 40. With this, an accurate position of the sensor 40, that is, an inclination of the movable reflection unit 20 when light is incident is specified. Then, the control unit 30 sets, based on the orientation, the timing at which the irradiation direction of the movable reflection unit 20 becomes the first position Sa and the timing at which the irradiation direction of the movable reflection unit 20 becomes the second position Sb. For example, a timing before a predetermined time when the output of the sensor 40 becomes a maximum is set as the timing at which the irradiation direction of the movable reflection unit 20 becomes the first position Sa, and a timing after a predetermined time from when the output of the sensor 40 becomes a maximum is set as the timing at which the irradiation direction of the movable reflection unit 20 becomes the second position Sb.

The position of the sensor 40 inside the measuring device 1 has, for example, an error due to attachment. Even though the same signal is input to a plurality of measuring devices 1, variation in the inclination angle of the movable reflection unit 20 occurs due to individual differences among the measuring devices 1. For this reason, it is hard to accurately recognize the position of the sensor 40. In contrast, in the modification example, a signal for controlling the inclination angle of the movable reflection unit 20 is set using the external sensor 100. For this reason, it is possible to detect the position of the sensor 40 with satisfactory accuracy, and as a result, to set the first position Sa and the second position Sb to appropriate positions.

MODIFICATION EXAMPLE 2

Sometimes the amplitude of the movable reflection unit 20 changes over time. In this case, the control unit 30 of the measuring device 1 needs to reset the first position Sa and the second position Sb. In the modification example, a method of resetting the first position Sa and the second position Sb will be described.

FIG. 9 is a flowchart showing a first example of a method of resetting the first position Sa and the second position Sb. First, the control unit 30 maxes the irradiator 10 emit light at each of temporary first position Sa and second position Sb (for example, the first position Sa and the second position Sb set at that time) (Step S10). Then, the output of the sensor 40 when the irradiator 10 is made to emit light at the first position Sa and the output of the sensor 40 when the irradiator 10 is made to emit light at the second position Sb are measured (Step S20). In a case where both of the two outputs are within the reference range (Steps S30: Yes), the control unit 30 ends the processing.

On the other hand, in a case where at least one of the first position Sa and the second position Sb is deviated the reference range, the one that deviated the reference range is corrected (Step S40). Specifically, in a case where the output of the sensor 40 at the first position Sa is greater than the reference range, the first position Sa is separated from the second position Sb. In a case where the output of the sensor 40 at the first position Sa is smaller than the reference range, the first position Sa is made to approach the second position Sb. Similarly, in a case where the output of the sensor 40 at the second position Sb is greater than the reference range, the second position Sb is separated from the first position Sa. In a case where the output of the sensor 40 at the second position Sb is smaller than the reference range, the second position Sb is made to approach the first position Sa. Thereafter, the processing shown in Step S30 is executed again.

Figure 11A:
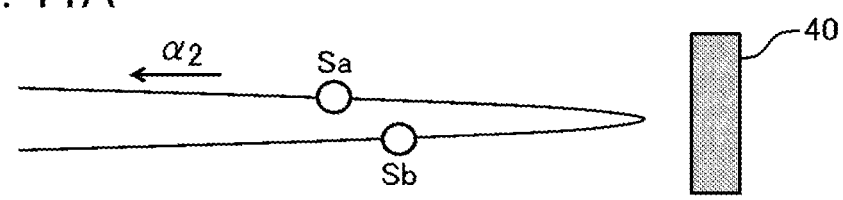
FIGS. 11A, 11B and LIC are diagrams schematically explaining the method shown in FIG. 10.
Figure 11B:
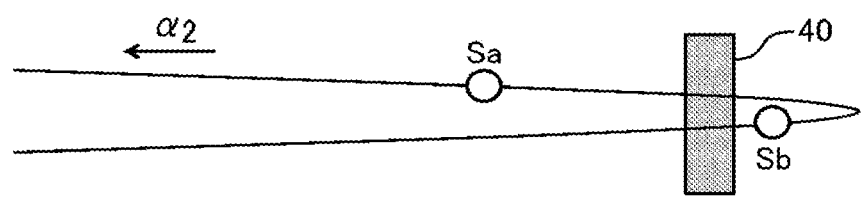
Figure 11C:
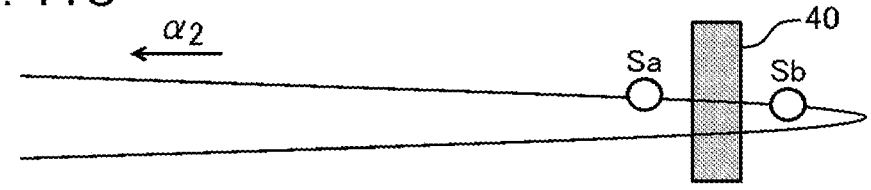

FIG. 10 is a flowchart showing a second example of a method of resetting the first position Sa and the second position Sb. FIG. 11 is a diagram schematically explaining the method shown in FIG. 10. First, the control unit 30 makes the irradiator 10 emit light at each of temporary first position Sa and second position Sb (for example, the first position Sa and the second position Sb set at that tine) (Step S110). Then, the output of the sensor 40 when the irradiator 10 is made to emit light at the first position Sa and the output of the sensor 40 when the irradiator 10 is made to emit light at the second position Sb are measured (Step S120).

Then, in a case where the difference is equal to or less than a second reference value (Step S130: No), there is a high possibility that both of the first position Sa and the second position Sb are positioned on the measurement range α2 side from the sensor 40 as shown in FIG. 11(A). For this reason, the control unit 30 expands the amplitude of the movable reflection unit 20 (Step S140), and then returns to Step S120.

On the other hand, in a case where the difference is equal to or greater than the reference value (Step S130: Yes), there is a high possibility that the first position Sa and the second position Sb interpose the sensor 40 therebetween as shown in FIG. 11(B). Thus, the same processing as Steps S20 to S40 of FIG. 9 is executed. Specifically, in a case where both of the two outputs are within the reference range (Step S150: Yes), the control unit 30 ends the processing. On the other hand, in a case where at least one of the first position Sa and the second position Sb is deviated from the reference range, the one that is deviated from the reference value is corrected (Step S160). A specific example of the correction is the same as Step S40 of FIG. 9. Thereafter, the output of the sensor 40 when the irradiator 10 is made to emit light at the first position Sa and the output of the sensor 40 when the irradiator 10 is made to emit light at the second position Sb are measured (Step S170), and the process returns to Step S150.

As described above, according to the modification example, the control unit 30 can reset the first position Sa and the second position Sb even though the amplitude of the movable reflection unit 20 changes over time. Accordingly, the control unit 30 can correct the amplitude of the movable reflection unit 20 with satisfactory accuracy.

Although the embodiments and examples have been described above referring to the drawings, the embodiments and the examples are merely illustrative, and various configurations other than those described above can be employed.

This application claims priority based on Japanese Patent Application No. 2018-029927, filed on Feb. 22, 2018, the entire disclosure of which is incorporated herein by reference.

The invention claimed is:

1. A measuring device comprising:
an irradiator that radiates an electromagnetic wave;
a movable reflection unit that reflects the electromagnetic wave;
a control unit that moves the electromagnetic waves along a first direction by controlling the irradiator and an operating reflector; and
a sensor that is able to receive the electromagnetic wave,
wherein the sensor is disposed at a position through which the electromagnetic wave passes when the electromagnetic wave is moved in the first direction,
wherein the control unit sets a movement range of the movable reflection unit so as to both of a magnitude of a first detection value that is a detection value of the sensor when the electromagnetic wave is irradiated at a first position positioned ahead of the sensor in the first direction and a magnitude of a second detection value that is a detection value of the sensor when the electromagnetic wave is irradiated at a second position positioned behind the sensor in the first direction are within a predetermined range, and
wherein a difference between a measurement timing of the first detection value and a measurement timing of the second detection value is constant.

2. The measuring device according to claim 1,
wherein the control unit performs control such that the movable reflection unit moves the electromagnetic wave in the first direction cyclically and simultaneously moves the electromagnetic wave in a second direction different from the first direction cyclically,
a cycle in the first direction of the electromagnetic wave is shorter than a cycle In the second direction of the electromagnetic wave, and
the sensor is a line sensor and extends in the second direction.

3. The measuring device according to claim 2, wherein the first position, the sensor, and the second position are arranged in an order in a width direction of the sensor.

4. A measuring device comprising:
an irradiator that radiates an electromagnetic wave;
a movable reflection unit that reflects the electromagnetic wave;
a control unit that moves the electromagnetic waves along a first direction by controlling the irradiator and an operating reflector; and
a sensor that is able to receive the electromagnetic wave,
wherein the sensor is disposed at a position through which the electromagnetic wave passes when the electromagnetic wave is moved in the first direction,
wherein the control unit sets a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction,
wherein the sensor is a line sensor,
wherein, in a width direction of the sensor, the first position is positioned outside the sensor in a direction in which the sensor extends, and overlaps the sensor, and
wherein the second position overlaps the sensor.

5. A measuring device comprising:
an irradiator that radiates an electromagnetic wave;
a movable reflection unit that reflects the electromagnetic wave;
a control unit that moves the electromagnetic waves along a first direction by controlling the irradiator and an operating reflector; and
a sensor that is able to receive the electromagnetic wave,
wherein the sensor is disposed at a position through which the electromagnetic wave passes when the electromagnetic wave is moved in the first direction,
wherein the control unit sets a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction,
wherein the control unit moves the electromagnetic wave in a measurement range narrower than a movable range of the electromagnetic wave of the movable reflection unit at a time of measurement, and
wherein the sensor is positioned within the movable range and outside the measurement range.

6. A measuring device comprising:
an irradiator that radiates an electromagnetic wave;
a movable reflection unit that reflects the electromagnetic wave;
a control unit that moves the electromagnetic waves along a first direction by controlling the irradiator and an operating reflector; and
a sensor that is able to receive the electromagnetic wave,
wherein the sensor is disposed at a position through which the electromagnetic wave passes when the electromagnetic wave is moved in the first direction,
wherein the control unit sets a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction, and
wherein the control unit makes a difference between the first detection value and the second detection value equal to or less than a first reference value in setting the movement range of the movable reflection unit.

7. The measuring device according to claim 6,
wherein, in setting the movement range of the movable reflection unit, the control unit
expands amplitude of the movable reflection unit such that the difference between the first detection value and the second detection value becomes equal to or greater than a second reference value, and
then determines the first position and the second position such that the first detection value and the second detection value satisfy a reference.

8. A control method for use in a measuring device including an irradiator that radiates an electromagnetic wave, a movable reflection unit that reflects the electromagnetic wave, a control unit that moves the electromagnetic waves along a first direction by controlling the irradiator and an operating reflector, and a sensor that is able to receive the electromagnetic wave, the sensor being disposed at a position through which the electromagnetic wave passes when the electromagnetic wave is moved in the first direction, the control method comprising a setting step of setting a movement range of the movable reflection unit so as to both of a magnitude of a first detection value that is a detection value of the sensor when the electromagnetic wave is irradiated at a first position positioned ahead of the sensor in the first direction and a magnitude of a second detection value that is a detection value of the sensor when the electromagnetic wave is irradiated at a second position positioned behind the sensor in the first direction are within a predetermined range, and a difference between a measurement timing of the first detection value and a measurement timing of the second detection value being constant.

9. A non-transitory storage medium storing a program that causes a computer to function as a control unit controlling a measuring device, the measuring device including:
an irradiator that radiates an electromagnetic wave;
a movable reflection unit that reflects the electromagnetic wave; and
a sensor that is able to receive the electromagnetic wave, the sensor being disposed at a position through which the electromagnetic wave passes when the electromagnetic wave moves in a first direction, the program providing the computer with:
a function of moving the electromagnetic waves along the first direction by controlling the irradiator and an operating reflector; and
a function of setting a movement range of the movable reflection unit so as to both of a magnitude of a first detection value that is a detection value of the sensor when the electromagnetic wave is irradiated at a first position positioned ahead of the sensor in the first direction and a magnitude of a second detection value that is a detection value of the sensor when the electromagnetic wave is irradiated at a second position positioned behind the sensor in the first direction are within a predetermined range, and a difference between a measurement timing of the first detection value and a measurement timing of the second detection value being constant.

10. The measuring device according to claim 4, wherein the control unit performs control such that the movable reflection unit moves the electromagnetic wave in the first direction cyclically and simultaneously moves the electromagnetic wave in a second direction different from the first direction cyclically, wherein a cycle in the first direction of the electromagnetic wave is shorter than a cycle in the second direction of the electromagnetic wave, and wherein the sensor extends in the second direction.

11. A measuring device comprising:
an irradiator that radiates an electromagnetic wave;
a movable reflection unit that reflects the electromagnetic wave;
a control unit that moves the electromagnetic waves along a first direction by controlling the irradiator and an operating reflector; and
a sensor that is able to receive the electromagnetic wave,
wherein the electromagnetic wave is a pulse wave,
wherein the sensor is disposed at a position through which the electromagnetic wave passes when the electromagnetic wave is moved in the first direction, and
wherein the control unit sets a movement range of the movable reflection unit using a first detection value that is a detection value of the sensor when the electromagnetic wave is irradiated at a first position positioned ahead of the sensor in the first direction and a second detection value that is a detection value of the sensor when the electromagnetic wave is irradiated at a second position positioned behind the sensor in the first direction.

* * * * *